United States Patent [19]
Fetterhoff et al.

[11] Patent Number: 5,240,543
[45] Date of Patent: Aug. 31, 1993

[54] APPARATUS FOR AND METHOD OF SEATING A FASTENER INSERT IN A HONEYCOMB PANEL

[75] Inventors: Donald C. Fetterhoff, St. Petersburg; Hien D. Do, Pinellas Park, both of Fla.

[73] Assignee: ATR International, Inc., Clearwater, Fla.

[21] Appl. No.: 810,707

[22] Filed: Dec. 18, 1991

Related U.S. Application Data

[63] Continuation-in-part of Ser. No. 536,433, Jun. 11, 1990, abandoned.

[51] Int. Cl.⁵ .................... B32B 31/06; F16B 39/02
[52] U.S. Cl. ........................... 156/293; 156/66; 156/305; 264/261; 264/278; 411/82
[58] Field of Search ............ 156/91, 293, 66, 305; 52/787, 707, 127.5, 744; 428/116; 264/278, 261, 262; 411/82, 258, 930; D8/DIG. 2; 425/11, 13

[56] References Cited

U.S. PATENT DOCUMENTS

| | | | |
|---|---|---|---|
| D. 165,119 | 11/1951 | Stuman | D8/DIG. 2 |
| D. 181,800 | 12/1957 | Lipton | D8/DIG. 2 |
| D. 198,028 | 4/1964 | Collins | D8/DIG. 2 |
| 3,339,609 | 9/1967 | Cushman | 264/278 |
| 3,564,798 | 2/1971 | Darby | 52/787 |
| 3,861,112 | 1/1975 | Caroselli | 52/127.5 |
| 4,212,610 | 7/1980 | Weidlich | 52/787 |

*Primary Examiner*—Michael W. Ball
*Assistant Examiner*—Daniel J. Stemmer
*Attorney, Agent, or Firm*—Herbert W. Larson

[57] ABSTRACT

A fastener insert attached to a mounting fixture is inserted into a hole drilled in a honeycomb panel. The mounting fixture has a rod with a disc at an end depending from a base and a chimney ascending from the base. Two bores are located in the base and are enclosed by the chimney. The mounting fixture base overlaps the head of the fastener insert which has two bores in the head. The bores in the fastener insert head are aligned with bores in the base of the mounting fixture. Epoxy is inserted into one of the bores in the base of the mounting fixture continuously until it returns out the second bore. The epoxy is allowed to cure and thereafter the mounting fixture is removed by a turning motion.

4 Claims, 3 Drawing Sheets

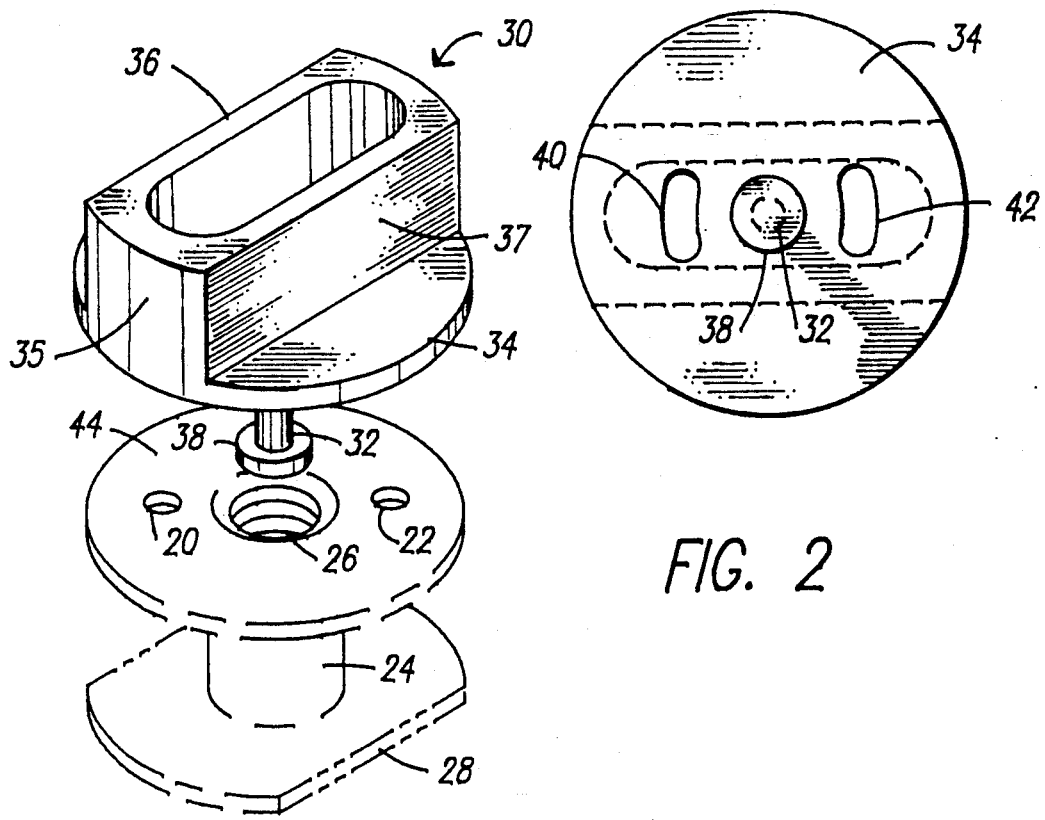
FIG. 1
FIG. 2
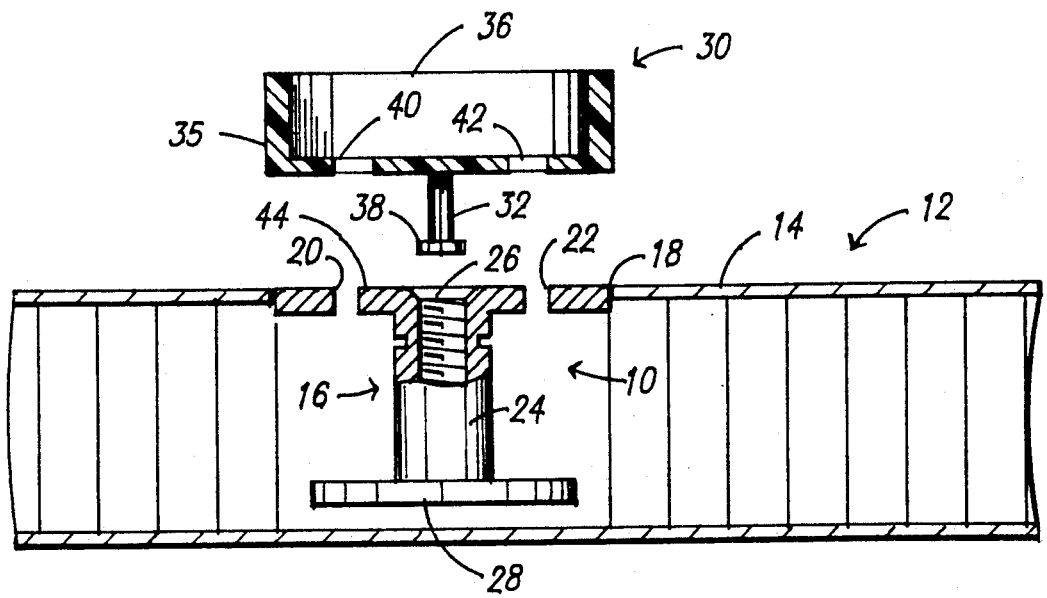
FIG. 3

APPARATUS FOR AND METHOD OF SEATING A FASTENER INSERT IN A HONEYCOMB PANEL

Prior Application

This application is a continuation-in-part of my U.S. patent application Ser. No. 07/536,433, filed Jun. 11, 1990, now abandoned.

BACKGROUND OF THE INVENTION

1. Field of The Invention

This invention relates to apparatus and methods of seating honeycomb panel fastener inserts. More particularly, it refers to the use of a plastic plug inserted into the screw threads of a fastener insert mounted in a honeycomb panel to ensure seating of the fastener flush with an exterior edge of the panel.

2. Description of the Prior Art

Fastener inserts as described in U.S. Pat. Nos. 4,800,643; 3,964,5331; 3,621,557; 3,564,798 and 3,282,015 are mounted in honeycomb panels commonly used in aircraft construction. These fastener inserts are used to provide a secure anchorage for auxiliary aircraft equipment such as luggage compartments and trim. The auxiliary equipment is held in place by bolts screwed into the threaded center portion of the fastener inserts. In mounting the fastener inserts, problems have occurred in positioning the insert at a right angle to the honeycomb panel in which it is inserted. Furthermore, extreme manual care was necessary to ensure that the insert was flush with the outer surface of the panel and with the axis of the insert normal to the outer panel surface.

Devices have been developed to assist in the proper alignment of fastener inserts such as shown in U.S. Pat. No. 3,392,225. This latter device has a removable tab for holding the insert in a hole while uncured potting compound is injected past the tab into the hole. Application of the tab to the insert is cumbersome and time consuming. U. S. Pat. No. 4,212,610 describes another device also developed to assist in the proper alignment of fastener inserts. This device requires a special tool to remove the device from the fastener. A new device and method is needed to improve the steps employed to align fastener inserts.

SUMMARY OF THE INVENTION

We have discovered an improved apparatus and method to align fastener inserts without the cumbersome and time consuming steps required by the prior art.

Our method uses a mounting fixture apparatus having a flat base plate with a rod having a disc attached to an end depending from the base and a chimney arising above the base enclosing two bores in the base. The mounting fixture is snapped to a fastener insert. The insert employed can be one, such as shown in U.S. Pat. No. 4,800,643, incorporated herein by reference. The fastener insert has two holes in the outer head, the head being large enough to either overlap the hole in the honeycomb panel or completely fill the opening in the skin sheet. The central body portion of the cylindrical insert fastener has a bore with screw threads for accepting a bolt.

The method is carried out by drilling a hole through at least one skin sheet of a honeycomb panel. After the mounting fixture is snapped or screwed into the central portion of the insert fastener so that its structure below the base is seated within the fastener insert threads, the insert is inserted into the hole in the panel. The base of the mounting fixture overlaps the head of the insert fastener and the hole in the panel skin. The bores in the mounting fixture base align over the holes through the head of the fastener insert. Epoxy is injected through one of the bores in the mounting fixture base until it returns through the other bore. The epoxy is then allowed to cure. After the epoxy is cured the mounting fixture is removed by a simple turning and pulling motion. The remaining underlying fastener insert is now properly seated in the honeycomb panel and is ready to receive a bolt from a piece of equipment to be mounted on the panel.

BRIEF DESCRIPTION OF THE DRAWINGS

The invention may be best understood by those having ordinary skill in the art by reference to the following detailed description when considered in conjunction with the accompanying drawings in which:

FIG. 1 is a perspective view of the mounting fixture employed in the method and a phantom view of one type of fastener insert.

FIG. 2. is a bottom plan view of the mounting fixture.

FIG. 3. is a cross section of the mounting fixture and a fastener insert in a honeycomb panel.

DETAILED DESCRIPTION OF THE INVENTION

Figure 4:
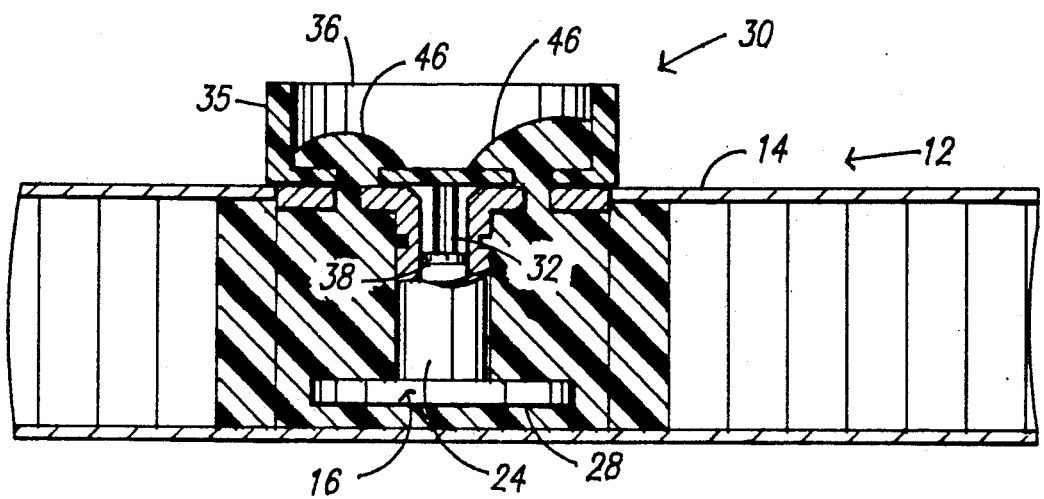
FIG. 4 is a cross section of the mounting fixture engaged with the fastener insert in a honeycomb panel and epoxy filling the voids.

Throughout the following detailed description, the same reference numerals refer to the same elements in all figures.

The method of this invention is carried out by first drilling or punching a hole 10 in a honeycomb panel 12 having an upper skin 14, as seen in FIG. 3. A fastener insert 16 usually with mounting fixture 30 snapped together is inserted into hole 10, so that fastener head 18 fills the opening to the hole 10, but the through bores or holes 20 and 22 in the head 18 permit entry of adhesive into the hole 10. The insert fastener 16 has a central body 24 which is cylindrical in shape and has an inner bore 26 which is threaded to accept a bolt. A flat base 28 terminates one end of the cylinder portion 24, and the head 18 terminates the other end.

A mounting fixture 30 is inserted into the fastener insert by inserting a descending rod portion 32, having a disc shaped element 38 at its end into the bore 26 of the fastener insert 16. The disc 38 snaps into the threads in bore 26. The rod 32 is integral with the circular planar base 34 which in turn is integral with chimney 36 ascending from the base 34 on the mounting fixture 30. The chimney is substantially rectangular in shape. The chimney has a pair of opposite upright narrow end walls 35 flush with an edge of the base 34 and a pair of opposite upright long side walls 37 spaced apart from an edge of the base 34. Chimney 36 encloses bores 40 and 42 in base 34. The bores 40 and 42 penetrate the base 34 as seen in FIGS. 2 and 3.

After the mounting fixture 30 is inserted into the fastener insert 16, the base 34 of the mounting fixture 30 rests flush on the top surface 44 of the fastener insert head 18. Bore 40 is aligned with bore 20 and bore 42 is aligned with bore 22. Base 34 slightly overlaps head 18 of the fastener insert and the hole 10.

Figure 5:
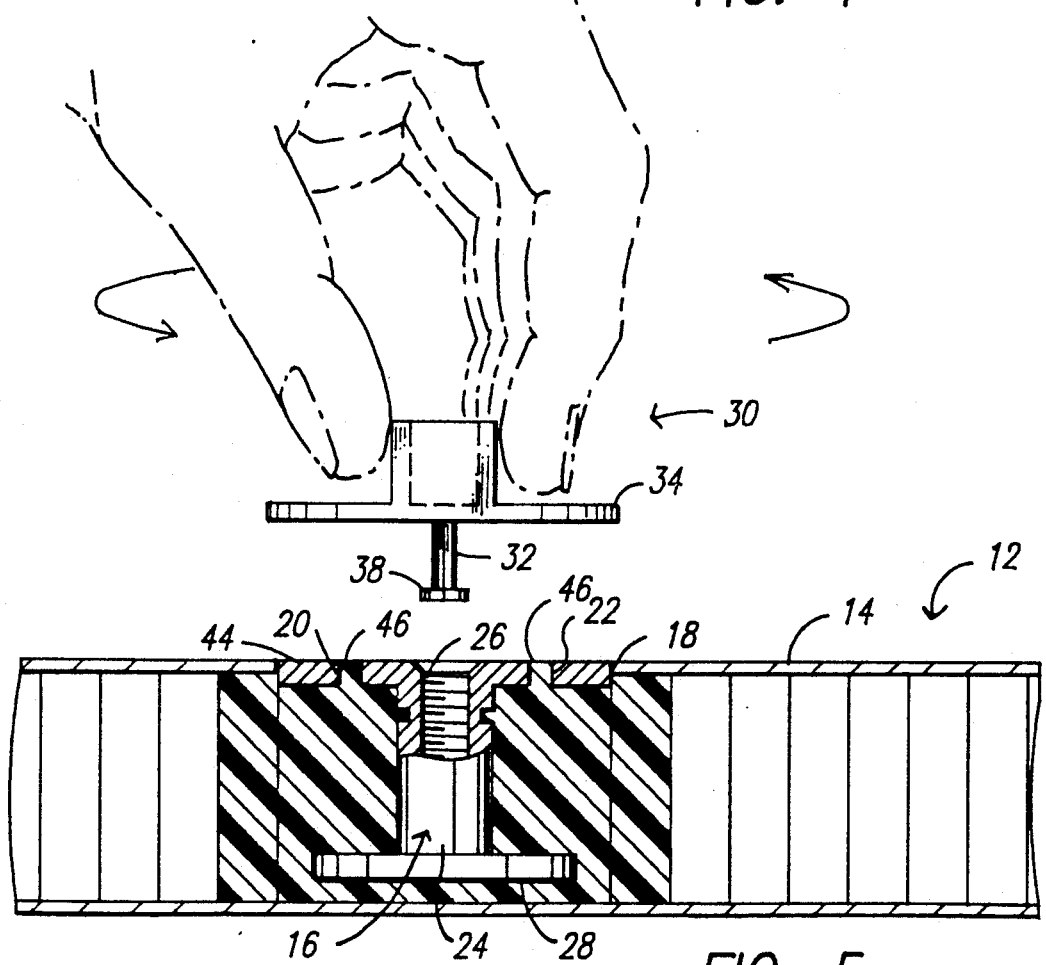
FIG. 5. is a view of the fastener insert and honeycomb panel in cross section showing the location of the epoxy after the mounting fixture is removed by a simple hand twisting and raising motion.
Figure 7:
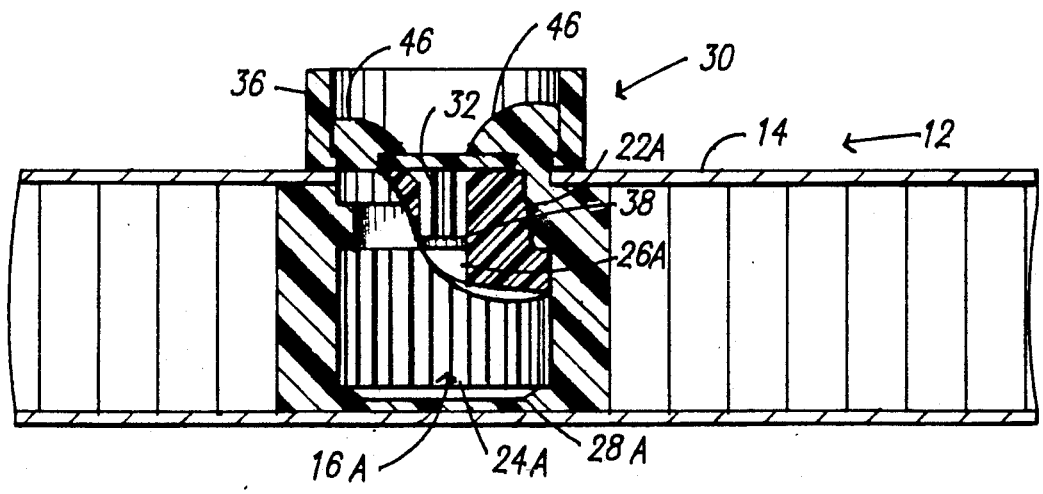
FIG. 7 is a cross section of the honeycomb panel and fastener insert showing the flow of epoxy adhesive prior to setting.

Epoxy 46 or other adhesive is inserted through the chimney to either of bores 40 or 42 and is continuously pumped until the hole 10 is filled with epoxy. Thereafter, assuming epoxy is pumped down through bore 40, the epoxy begins to rise and exits bore 22 and enters the chimney 36 through bore 42. As soon as the operator sees the epoxy 46 entering the chimney 36 through the alternate bore hole the procedure is stopped and the epoxy is allowed to cure. After curing, the mounting fixture is removed by a twisting and pulling motion by hand as see in FIG. 5. No tool is required. The cured epoxy 46 as seen in FIGS. 5 and 7 fills the hole 10 of the honeycomb panel and securely holds the fastener insert 16 or 16A in the honeycomb panel 12.

Figure 6:
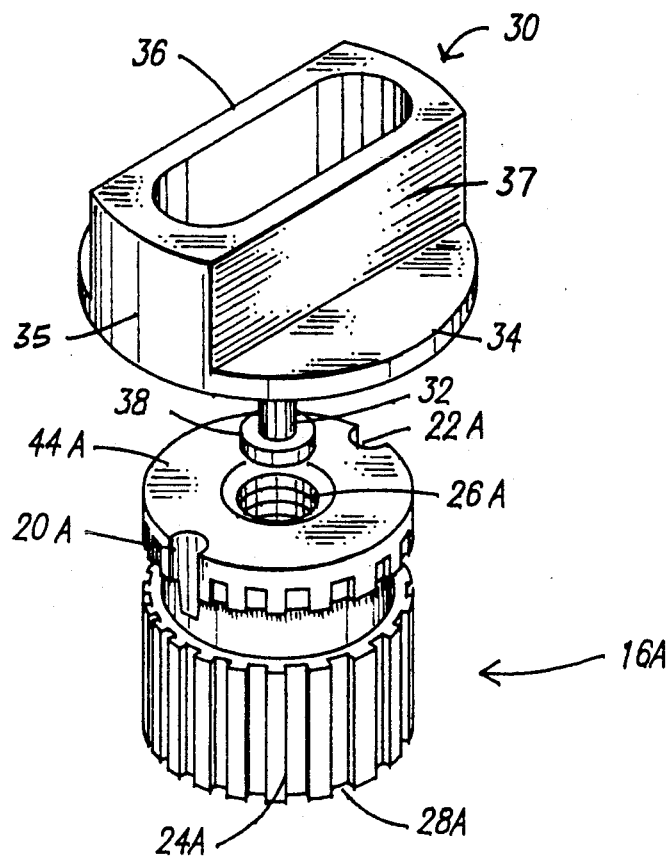
FIG. 6. Is a perspective view showing the mounting fixture about to be snapped into another type of fastener insert.

Another type of fastener, insert 16A, can be used in this method with the same mounting fixture 30, as seen in FIG. 6. Fastener 16A has a top surface 44A with semi-circular grooves 20A and 22A on opposite edges. The fastener 16A has a central bore 26A with internal threads. The fastener has a cylindrical bottom portion 24A tapering to a bottom surface 28A. The mounting fixture 30 is snapped into the fastener 16A and the joined fastener 16A is then inserted into hole 10 so that the top surface 44A is flush with surface 14 of the honeycomb panel 12. Epoxy is pumped into one of the bores in base 34 and after filling hole 10 exits partially through the other bore in base 34 enclosed by chimney 36. After the epoxy is set, the mounting fixture is removed by a simple twisting and pulling action to break the epoxy joint between the insert and fixture.

Bolts from aircraft auxiliary equipment or other lightweight equipment can be screwed into the fastener insert through bore 26 or 26A and thereby can be securely held in place adjacent the honeycomb panel.

The mounting fixture employed in this method is made of a polymer such as polyethylene, polypropylene, an acrylic polymer, or a copolymer thereof.

The chimney 36 employed in the mounting fixture 30 captures the overflow epoxy to keep the surface around the mounting fixture clean. In addition, the rod 32 and disc 38 act to prevent epoxy from contaminating the threads in bore 26 of the fastener insert.

Other fastener inserts in addition to the two types described, suitable for use in honeycomb panels can be employed with the mounting fixture of this invention.

Having thus described the invention, what is claimed and desired to be secured by Letters Patent is:

1. A method of aligning and seating a fastener insert in a honeycomb panel, the fastener insert having an internal threaded bore and an epoxy access hole on each side of the threaded bore in a top circular plate, the method comprising
    a. providing a mounting fixture having a circular planar base plate, a means for engaging the internal threads of the fastener insert descending from a central portion of the base plate, a substantially rectangular chimney ascending from the base plate with oppositely positioned ends of the chimney being curved to form an integral ascending wall with portions of opposite edges of the planar base, wherein the chimney allows the mounting fixture to be manipulated by hand,
    b. inserting the means for engaging the internal threads of the fastener insert into the internal threaded bore of the fastener insert,
    c. aligning a pair of oppositely positioned bores in the mounting fixture base plate enclosed within the chimney with the access holes in the top circular plate of the fastener insert,
    d. seating the circular planar base plate of the mounting fixture flush with a top surface of the fastener insert,
    e. inserting the attached fastener insert into a hole drilled in a skin surface of the honeycomb panel so that the base of the mounting fixture overlaps the honeycomb panel hole,
    f. injecting a flowable adhesive into one of the bores in the mounting fixture base and continuing to pump adhesive until the adhesive returns in the other bore enclosed by the chimney,
    g. allowing the adhesive to cure and
    h. twisting and pulling the mounting fixture by hand and without the use of a tool to remove it from the fastener insert, leaving the fastener insert properly aligned and seated in the honeycomb panel.

2. The method according to claim 1 wherein the adhesive is an epoxy.

3. The method according to claim 1 wherein the mounting fixture is made from a polymer.

4. The method according to claim 1 wherein the means for engaging the internal threads of the fastener insert is a disc integral with an end of a rod descending from the mounting fixture base.

* * * * *